(12) United States Patent
Scotton

(10) Patent No.: US 7,318,617 B1
(45) Date of Patent: Jan. 15, 2008

(54) PORTABLE CARGO CONTAINER AND COVER SYSTEM

(75) Inventor: Kevin Curtis Scotton, Aberdeen, NC (US)

(73) Assignee: McMurray Fabrics, Inc., Aberdeen, NC (US)

( * ) Notice: Subject to any disclaimer, the term of this patent is extended or adjusted under 35 U.S.C. 154(b) by 218 days.

(21) Appl. No.: 11/216,664

(22) Filed: Aug. 31, 2005

(51) Int. Cl.
*B60N 27/00* (2006.01)

(52) U.S. Cl. .................. 296/37.16; 296/37.1; 224/484; 224/567

(58) Field of Classification Search ............... 296/37.1, 296/37.8, 37.16; 224/400, 484, 567
See application file for complete search history.

(56) References Cited

U.S. PATENT DOCUMENTS

| | | | |
|---|---|---|---|
| 2,405,517 A | 8/1946 | Plummer | |
| 3,446,526 A * | 5/1969 | Peters ..................... | 296/37.16 |
| 4,139,231 A | 2/1979 | Lang et al. | |
| 4,220,367 A | 9/1980 | Gale et al. | |
| 4,480,675 A | 11/1984 | Berkemeier | |
| 4,502,674 A * | 3/1985 | White et al. ............. | 296/37.16 |
| 4,671,557 A | 6/1987 | Lemp | |
| 5,238,284 A | 8/1993 | Whitaker | |
| 5,368,210 A | 11/1994 | Wotring | |
| 5,464,052 A | 11/1995 | Wieczorek et al. | |
| 5,628,442 A | 5/1997 | Wayne | |
| D383,112 S | 9/1997 | Patterson | |
| 5,685,470 A | 11/1997 | Moore | |
| 5,685,592 A | 11/1997 | Heinz | |
| 5,772,370 A * | 6/1998 | Moore ....................... | 410/100 |
| 5,855,310 A | 1/1999 | Van Ert et al. | |
| 5,947,358 A | 9/1999 | Wieczorek | |
| RE36,345 E | 10/1999 | Moore | |
| 6,030,160 A | 2/2000 | Moore | |
| 6,099,222 A | 8/2000 | Moore | |
| 6,302,463 B1 * | 10/2001 | Moore et al. ............ | 296/24.43 |
| 6,334,562 B1 | 1/2002 | Ament et al. | |
| 6,345,944 B1 | 2/2002 | Florence | |
| 6,375,055 B1 | 4/2002 | Spykerman et al. | |
| 6,481,773 B1 | 11/2002 | Salani et al. | |
| 6,550,654 B1 | 4/2003 | Crago | |
| 6,702,169 B2 | 3/2004 | Eipper | |
| 6,722,542 B2 | 4/2004 | McMurray et al. | |
| 6,821,600 B1 | 11/2004 | Henson | |
| 2002/0000734 A1 * | 1/2002 | Bharj et al. .............. | 296/37.16 |
| 2002/0163220 A1 * | 11/2002 | Ament et al. ............. | 296/37.16 |
| 2004/0021332 A1 * | 2/2004 | Hansen et al. ........... | 296/37.16 |
| 2004/0094589 A1 | 5/2004 | Fricano | |
| 2004/0222475 A1 * | 11/2004 | Hao et al. ................. | 257/376 |
| 2005/0134075 A1 * | 6/2005 | Kim ......................... | 296/37.16 |
| 2006/0208518 A1 * | 9/2006 | Ament et al. ............. | 296/37.16 |

* cited by examiner

Primary Examiner—Lori L. Lyjak
(74) Attorney, Agent, or Firm—Kilpatrick Stockton LLP

(57) ABSTRACT

A portable cargo container and cover system includes a container portion for stowing cargo in a vehicle cargo area, a cover portion for concealing cargo from view in the cargo area, and an attachment means for removably attaching the system to the cargo area. When the system is removed from the vehicle cargo area, cargo stowed in the container portion can be manually transported in the container portion outside the vehicle.

50 Claims, 4 Drawing Sheets

PORTABLE CARGO CONTAINER AND COVER SYSTEM

FIELD OF THE INVENTION

The present invention relates to a cargo container and cover system, and in particular, to a cargo container and cover system that is portable. Embodiments of the present invention are useful for stowing and transporting cargo both in a vehicle and manually outside the vehicle.

BACKGROUND OF THE INVENTION

A wide array of convenience nets, storage trays, and other devices for stowing cargo items are available for use in vehicles. Automotive storage nets have become particularly desirable, not only to prevent damage to the stowed item(s) but to prevent the stowed item(s) from causing damage to other items which may be typically carried in a vehicle storage area, for example, a compact disk player mounted in the trunk of a car.

Conventional vehicle storage nets have a number of disadvantages. For example, some conventional vehicle storage nets and devices are permanently attached to the cargo or trunk area of a vehicle. As such, these nets and devices are not removable from the vehicle for transporting the items stowed in the devices. Instead, in order to transport the contents of a vehicle storage device to another location, the storage device must be opened and the items removed and either individually transported or loaded into another container for transportation.

Other vehicle storage devices which are removable from the vehicle are generally large, and/or complicated to attach and detach to remove and replace on a regular basis. Such conventional vehicle storage devices are often bulky, heavy, and/or cumbersome to handle. As such, conventional removable vehicle storage devices are not particularly well suited to transport the items stowed in them away from the vehicle.

Another disadvantage is that conventional vehicle storage nets often have an open portion that allows items contained within the net to become dislodged during vehicular movement or when moving items around while looking for an item or adding another item to the stowage. To address this problem, some storage devices include a closure mechanism, such as a drawstring, for closing the top of a container after items have been placed inside. While this approach solves one problem, it is disadvantageous in that successfully closing the opening of such storage devices often requires two hands to simultaneously manipulate the storage container and closure mechanism together.

Further, conventional stowage/transporting means generally have only one large compartment, which makes it difficult to transport a mixture of heavy items with more delicate or fragile items without risk of damage to the more fragile items.

Many vehicles are designed with storage compartments located between rear seats and rear access doors, for example, in a station wagon, hatch-back models, utility vehicles, sports vehicles, vans, trucks, and the like. Items stored in such a storage compartment are exposed through multiple windows to the eyes of passersby. With high visibility into vehicles of such designs, there is an increased risk that a vehicle will be broken into when items that may be stowed in the cargo area can be readily observed. To decrease this risk, various types of security shades have been adapted for covering an interior area in a motor vehicle to obstruct the view into the interior area.

Often, security shades are comprised of a flexible fabric panel wrapped onto a roller tube which is mounted to a support structure in the vehicle. The roller tube is rotationally biased so that the panel can be extended to cover the cargo compartment area and retracted onto the roller tube for storage when not in use. The shade panel is sized to cover the entire cargo area so as to screen and cover articles stowed in the cargo area from view and reduce the risk of theft. Such a roller tube, flexible panel, and retraction mechanism combination often involves a large number of components that make the security shade expensive to manufacture.

For many vehicles, security shades are mounted so that the roller tube is positioned across the forward end of the cargo area with the shade panel being extendable rearward toward the vehicle's rear cargo door. Often the security shade is positioned behind a rear seat which can be folded down to enlarge the cargo area of the vehicle. When the cargo area is enlarged by folding a seat, the security shade needs to be removed to prevent it from obstructing and limiting full use of the cargo area.

Some models of conventional vehicle security shades are removable from the vehicle. Disadvantages of such conventional security shades are that they are difficult to remove from and replace in a vehicle and are bulky to transport in the vehicle when not in use. As a result, such security shades are often left out of vehicles and not used.

While security shades generally function well to cover the rear cargo area, security shade designs have other limitations. One disadvantage with conventional security shade design is access to contents being stowed in the cargo area when the shade panel is extended. If access is required, it is difficult to gain access from within the vehicle. Rather, the vehicle must be stopped, the rear access door opened, and the shade panel completely retracted in order to uncover stowed items. After obtaining the article from the cargo area, the shade panel must be re-extended and secured and the rear access door of the vehicle closed. In addition, such a conventional security shade does not permit stowing cargo in one section of a vehicle cargo area while concealing cargo from view in another section of the cargo area.

Another conventional security cover is integral with a storage compartment having rigid walls and a hinged lid for mounting adjacent a spare tire in a vehicle cargo area. However, such a security shade/storage compartment combination is not portable.

Thus, there is a need to provide a cargo container and cover system that will securely contain cargo items in a vehicle cargo area, that conceals cargo from view in the cargo area, that is quickly and easily removable from the vehicle, and that can be used to manually transport the cargo items outside the vehicle. There is also a need for a such portable cargo container and cover system that allows access to cargo stowed in the container portion without unattaching the cover portion from the cargo area.

SUMMARY OF THE INVENTION

The present invention provides a portable cargo container and cover system that includes a container portion for stowing cargo in a vehicle cargo area, a cover portion for concealing cargo from view in the cargo area, and an attachment means for removably attaching the system to the cargo area. The container portion can be positioned in a first section of the vehicle cargo area, and the cover portion can be positioned for concealing cargo from view in a second section of the cargo area. When the system is removed from the vehicle, cargo stowed in the container portion can be manually transported in the container portion.

In an embodiment, the container portion includes a front panel and a back panel, and the sides and bottom of the panels are closed. The container portion further includes a means, such as an elastic cord, for drawing the front and back panels together at the top of the panels firmly enough as to prevent stowed cargo from inadvertently escaping from the container portion. The container portion may include an elongated support member extending along the width of the container portion at its top. A handle can be attached to the elongated support member for manually transporting the system.

In an embodiment, the cover portion comprises a panel of substantially opaque material contiguous with the container portion and extending a length in a direction opposite the container portion. The cover portion is selectively deployable to at least one position remote from the container portion. The cover portion can have a dimension sufficient to cover substantially all of the vehicle cargo area. Once the cover portion is attached to the vehicle cargo area, cargo stowed in the container portion is accessible without unattaching the cover portion from the cargo area.

Features of a portable cargo container and cover system of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A portable cargo container and cover system of the present invention provides numerous advantages over prior vehicle cargo nets and covers. For example, the present invention advantageously provides a portable cargo container and cover system that can be used to stow and transport cargo in a vehicle and that can also be used as a means for transporting items stowed in the container portion after the system is removed from the vehicle.

Another advantage is that the present invention provides a portable cargo container and cover system that includes a cover for an vehicle cargo area for use in concealing, from outside view, items stored in a normally visible cargo area.

Another advantage is that the present invention provides a portable cargo container and cover system that can be used to stow cargo in one section of a vehicle cargo area and conceal cargo from view in another section of the cargo area.

Another advantage is that the present invention provides a portable container and cover system that allows access to items stowed in the container portion from either inside or outside the vehicle without retracting or removing the cover portion to uncover the stowed items.

Another advantage is that the present invention provides a portable cargo container and cover system that is securely attachable to a vehicle cargo or trunk area to reliably contain items during vehicular movement. Embodiments of the present invention can be easily installed in and easily removed from the cargo area of a vehicle without the use of tools.

Another advantage is that the present invention provides a portable cargo container and cover system that is attachable to a vehicle cargo or trunk area in a variety of configurations.

Another advantage is that the present invention provides a portable cargo container and cover system that provides both a cargo container and a cargo cover that do not interfere with the rearward deployment of a rear seat of a vehicle.

Another advantage is that the present invention provides a portable cargo container and cover system that can include multiple compartments for stowing cargo, thereby securely containing items of various sizes and/or protecting one or more items from other items.

Another advantage is that the present invention provides a portable cargo container and cover system that provides a cargo cover that is a more functional, lower cost, and more attractive cover than conventional retractable security shades that are often removed from a vehicle and not used.

As will be realized by those of skill in the art, many different embodiments of a portable cargo container and cover system according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Figure 1:
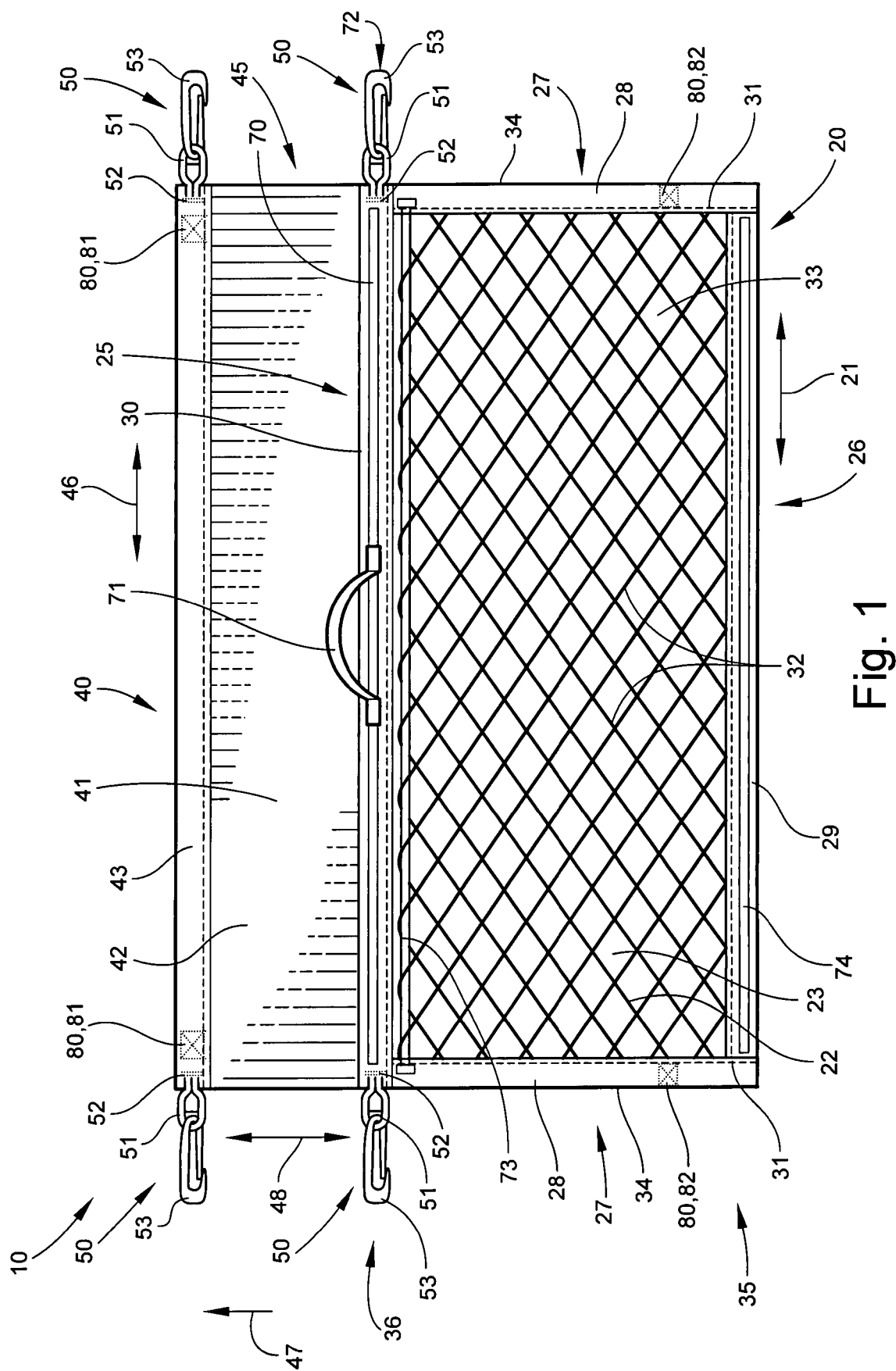
FIG. 1 is a view of a portable cargo container and cover system in an embodiment of the present invention.
Figure 2:
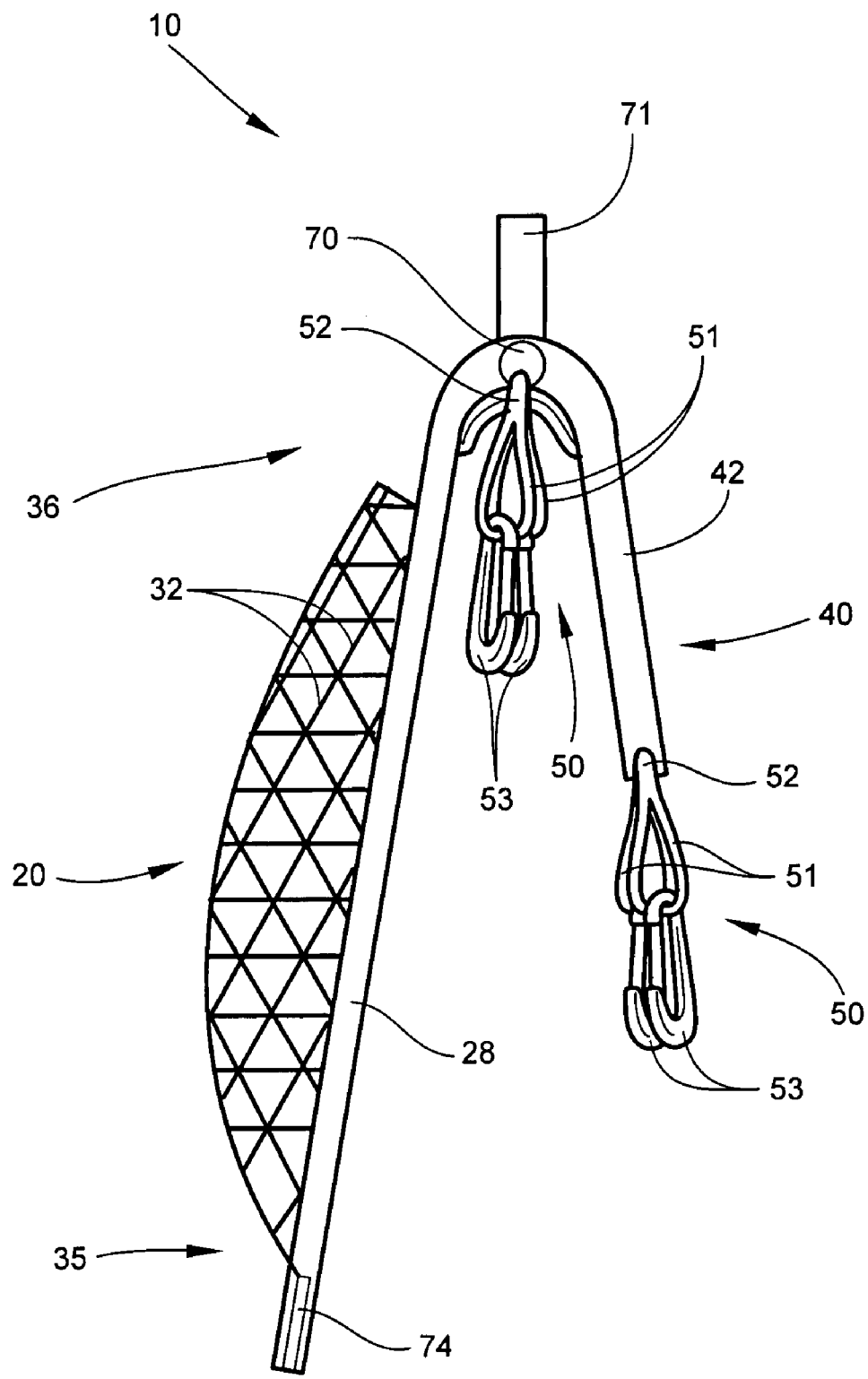
FIG. 2 is a side view of the portable cargo container and cover system shown in FIG. 1, showing the system in folded position for manual transportation in an embodiment of the present invention.
Figure 3:
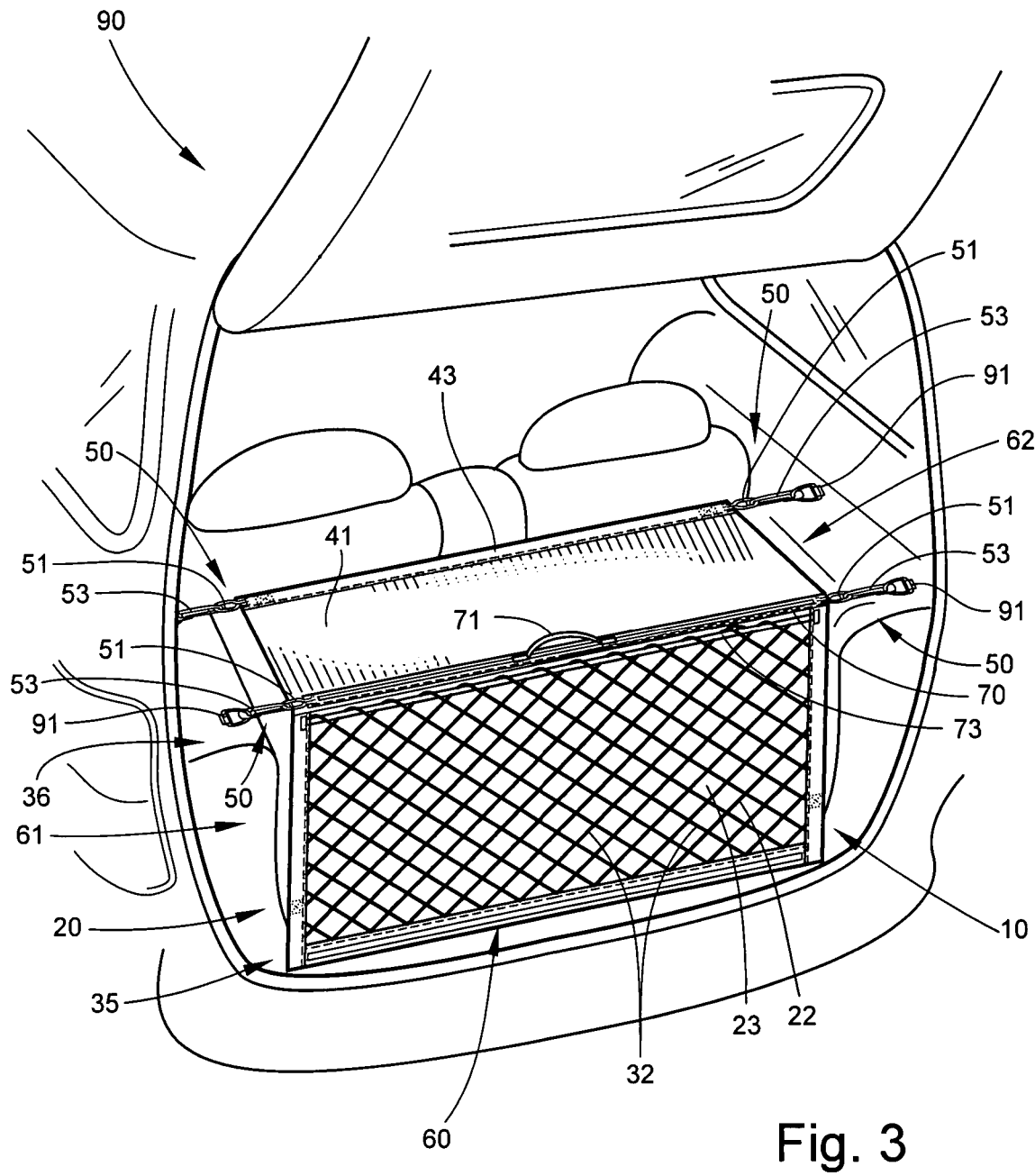
FIG. 3 is a perspective view of the portable cargo container and cover system shown in FIG. 1, installed in the cargo area of a vehicle in an embodiment of the present invention.

FIGS. 1-4 show various embodiments of a portable container and cover system 10 of the present invention. In an embodiment, as shown in FIGS. 1-3, the portable cargo container and cover system 10 includes a container portion 20 for stowing cargo in a vehicle cargo area 60, a cover portion 40 for concealing cargo from view in the vehicle cargo area 60, and an attachment means 50 for removably attaching the system 10 to the vehicle cargo area 60.

The container portion 20 can include a front panel 22 and a back panel 23. A side webbing 28 is secured about the edge of each side 27 of the front panel 22 and back panel 23 to enclose opposing sides 34 of the container portion 20. A bottom webbing 29 is secured about the edges of the front panel 22 and back panel 23 at the bottom 26 of each panel 22, 23 along the width 21 of the container portion 20 to enclose a bottom 35 of the container portion 20. A top webbing 30 is secured at the edge of the top 25 of the back panel 23 along the width 21 of the container portion 20. The side, bottom, and top webbings 28, 29, and 30, respectively, can each comprise a solid material, such as nylon. The side, bottom, and top webbings 28, 29, and 30, respectively, can be secured at their respective locations on the container portion 20, for example, by sewing, as shown by the sew lines 31.

The portable cargo container and cover system 10 can include includes a means for drawing the front and back panels 22, 23 together firmly enough as to prevent stowed cargo from inadvertently escaping from the container portion 20. In the embodiment shown in FIGS. 1-3, the means for drawing the front and back panels together comprises an elastic cord 73 extending along the width 21 of the container portion 20 and attached at the top 25 of the front panel 22 and at each end of the cord to the side webbing 28 adjacent the top webbing 30.

The elastic cord 73 can be flat, round, or have other cross-sections. The elastic cord 73 can be attached by various means, for example, by sewing, or "bar-tacking," the end of the cord to the webbing. In an embodiment in which the container portion 20 front panel 22 comprises a netting material 32, as shown in FIGS. 1-3, the elastic cord 73 can be threaded, or interlaced, through web-like openings in the netting 32. The elastic cord 73 is generally of sufficient elasticity to allow the container portion 20 to be opened to stow cargo items in the container portion 20 and to return to its original state to maintain the top 36 of the container portion 20 in closed position. In an embodiment, the elastic cord 73 can have sufficient elasticity to minimize movement of the front and back panels 22, 23 when items are placed inside. An embodiment of the present invention provides a means for satisfactorily restraining cargo from entering the passenger compartment of a vehicle, thereby advantageously providing safety to passengers.

In an embodiment, as shown in FIGS. 1-3, the container portion can include an elongated support member 70 extending along the width 21 of the container portion 20 at its top 36. A handle 71 can be attached to the elongated support member 70 to provide a means for grasping and manually transporting the system 10. The cover portion 40 can be folded along a fold axis along the elongated support member 70 so that the cover portion 40 folds into juxtaposition with the container portion 20.

An embodiment of the present invention may further include a rigid member 74 extending along the width 21 of the container portion bottom 35. The rigid member 74 provides rigidity to the bottom 35 of the container portion 20, thereby maintaining the shape of the container portion bottom 35. A more rigid, shape-defined bottom 35 of the container portion permits easier insertion of cargo items into the container portion 20 and helps to keep cargo items in place during transportation.

In the embodiment shown in FIGS. 1-3, the cover portion 40 comprises a panel 41 comprising a substantially opaque material 42 contiguous with the container portion 20 and extending a desired length 48 in a direction 47 opposite the container portion 20. A cover portion webbing 43 is secured about the edge of the cover portion 40 opposite the container portion 20 along the width 46 of the cover portion 40. In an embodiment, the cover portion 40 comprises a dimension sufficient to cover substantially all of the vehicle cargo area 60. The cover portion 40 can be selectively deployed to at least one position remote from the container portion 20.

Tension of the cover portion panel 41 can be maintained after it is attached to the vehicle cargo area 60. As such, the cover portion 40 can present a substantially smooth, flat surface to an observer looking in from outside of the vehicle. Thus, the cover portion 40 can be deployed over a vehicle cargo area 60 such that the cover portion 40 has the same appearance whether items are stored beneath it or not, thereby decreasing interest in covered items.

The attachment means 50 is secured to each side 34 near the top 36 of the container portion 20 and near each side 45 of the cover portion 40 distal from the container portion 20. In the embodiment shown in FIGS. 1-3, the attachment means 50 comprises a cord loop 51 attached with stitching 52 to the container portion 20 and the cover portion 40. A biased attachment clip for attaching to the vehicle cargo area 60 is attached to each cord loop 51.

In an embodiment of the present invention, as shown in FIG. 3, the attachment clips 53 can be removably attached to an attachment surface 91, such as to the interior walls of the vehicle cargo area 60 in a motor vehicle 90. Embodiments of the present invention can be easily installed in and easily removed from the cargo area 60 of the vehicle 90 without the use of tools. The container portion 20 can be positioned in a first section 61 of the cargo area of the motor vehicle 90, and the cover portion 40 can be positioned for concealing cargo from view in a second section 62 of the vehicle cargo area. As such, cargo stowed in the container portion 20 can be accessed either inside or outside the vehicle 90 without unattaching the cover portion 40 from the vehicle cargo area 60. Thus, an embodiment of the present invention provides a portable cargo container and cover system 10 that can be used to stow and transport cargo in a vehicle 90 and that can also be used as a means for manually transporting items stowed in the container portion 20 after the system 10 is removed from the vehicle 90. The combination of a container portion 20 and a cover portion 40 allows the system 10 to be used to conceal, from outside view, items stored in the normally visible cargo area 60.

In an embodiment (not shown), other attachments means, for example, a loop 51 of elastic cord attached to the side webbing 28, can be used to removably attach the system 10 to the vehicle cargo area 60. In yet another embodiment (not shown), the elongated support member 70 can be extended on each end to include a loop, or other configuration, to removably attach to the interior walls of the vehicle cargo area 60. The attachment means 50 can be attached to an attachment surface 91 in the vehicle cargo area 60. The attachment surface 91 may be a D-ring, which is attached to an interior wall of the vehicle cargo area 60. D-rings can be of the type that can be urged outward from a cavity in the interior walls of the vehicle cargo area 60. In other embodiments (not shown), an attachment clip 53, cord loop 51, or other attachment means 50 can be removably attached to a hook, wall slot, knob-shaped or T-shaped attachment surface, or other appropriately configured attachment surface 91 in the vehicle cargo area 60.

The portable cargo container and cover system 10 can include a fastening means 80 for fastening the cover portion 40 to the container portion 20. As shown in the embodiment in FIGS. 1 and 3, the fastening means 80 can include a first fastener portion 81 secured near each of opposing sides of the cover portion webbing 43 and a second fastener portion 82 matingly engageable with the first fastener portion 81 secured at a location on each container portion side webbing 28 a distance substantially equal to the length 48 of the cover portion 40. The fastening means 80 can be any type of inexpensive fastening mechanism for fastening together the container portion 20 and the cover portion 40. For example, the fastening means can be a hook-and-loop-type fastener.

A feature of a portable cargo container and cover system 10 of the present invention is that it is manually portable before being placed in, and after being removed from, the vehicle cargo area 60. Embodiments of the portable cargo container and cover system 10 can include a means for manually transporting the system and the contents within the container portion 20. In an embodiment, the means for manually transporting the system can include a handle 71 attached to the elongated support member 70. Such a handle 71 can provide a means for grasping the system 10 to manipulate it into position in the vehicle cargo area 60 and to transport the system outside the vehicle 90. In embodiments in which the handle 71 is attached to the elongated support member 70, the handle 71 can be made from a material such as the webbing material or vinyl.

In another embodiment, the handle 71 can be integrally formed with the elongated support member 70. For example, the handle 71 can be extruded along with the elongated support member 70. The handle 71 can be formed to have a low profile in the vehicle cargo or trunk area 60 surfaces. In another embodiment, the front and back panels 22, 23 of the container portion 20 can include aligned cut-outs near the center of the top 25 of each panel 22, 23. In this way, the elongated member 70 can be grasped by placing one's hand through the cut-outs, thereby providing a means for grasping the system 10 to manipulate and/or transport it. Alternatively, in an embodiment without a cut-out, the elongated member 70 and flexible material 33 near the top 25 of each container portion panel 22, 23, and the adjacent cover portion panel 41, can be grasped to manipulate and/or transport the system 10.

Removing the portable cargo container and cover system 10 from a vehicle cargo or trunk area 60 involves disengaging the attachment means 50, such as a biased-closed attachment clip at the top of each side 34 of the container portion 20 and at opposite corners of the cover portion 40, from the attachment surfaces 91 in the vehicle cargo area 60. When the handle 71 and/or elongated support member 70 are lifted, the cover portion 40 can be folded into juxtaposition with the container portion 20, preferably along the fold axis 72 along the elongated support member 70. In this manner, the portable cargo container and cover system 10 can be readily transported to a desired location and is compactable for storage. A portable container and cover system 10 of the present invention can be easily carried with one hand.

In another embodiment, a portable container and cover system 10 of the present invention can include a set of wheels on the bottom 35 of the container portion 20. In such an embodiment, when the system 10 is removed from the vehicle 90, it can be transported by placing the wheels on the ground and pulling the handle 71. This feature may be advantageous when items stowed in the container portion 20 are heavy or need to be transported over a long distance or over rough terrain.

In an embodiment, a cargo container and cover system 10 can include a fastening means for fastening the cover portion 40 to the container portion 20. The fastening means 80 allows the cover portion 40 to be folded along the fold axis 72 and maintained in juxtaposition with the container portion 20. When the cover portion 40 is folded and held in position with the fastening means 80 adjacent the container portion back panel 23, the container portion 20 can be used to stow cargo in a vehicle cargo area 60 without using the cover portion 40 to cover cargo in another section of the cargo area 60. In an embodiment, the cover portion 40 can be folded and held in position with the fastening means 80 adjacent the container portion back panel 23 such that cargo in the container portion 20 can be viewed through, for example, an open mesh netting front panel 22, while installed in a vehicle cargo area 60 and/or while being manually transported after removal from the vehicle 90. In an alternative embodiment, the cover portion can be folded and held in position with the fastening means 80 adjacent the container portion front panel 22 such that cargo in the container portion 20 can be concealed from view while installed in a vehicle cargo area 60 and/or while being manually transported after removal from the vehicle 90.

In embodiments of the present invention, the container portion 20 can be sized to contain and transport variously-sized cargo, for example, sports equipment, tools, camping, fishing, and beach gear, groceries, and numerous other items. Such a system 10 can contain and transport both large and small items. As shown in the embodiment in FIGS. 1 and 3, the front panel 22 and the back panel 23 of the container portion 20 may be generally rectangular and can have substantially the same dimensions. The cover portion 40 can comprise various sizes and shapes. The cover portion 40 can have dimensions sufficient to cover substantially all of the cargo area 60, for example, from the back of rear seats to a rear access door of the vehicle 90. Alternatively, the cover portion 40 can have dimensions co-extensive with a particular section of the vehicle cargo area 60 to be covered.

In an embodiment of the present invention, the container portion 20 can include multiple compartments. Compartments may be formed by attaching a portion of netting material 32, or other material, at selected locations between the front and back panels 22, 23 of the container portion 20. Alternatively, partitions that form compartments in an embodiment of a container portion 20 of the present invention may be integral with the front and back panels 22, 23 of the container portion 20 by weaving or knitting the container portion 20 in such pattern. The compartments may be of the same size or differing sizes and may have different configurations. For example, one compartment may be narrow and configured to securely contain a relatively narrow item, such as a bottle of sports drink or a can of tennis balls. Another compartment may be wider and configured to securely contain a larger item, such as a soccer ball or roller blades. Container portions 20 having multiple compartments can be thusly configured to securely contain a heavy item in one container and a lighter weight, more fragile item in another compartment so that there is minimal risk of the heavier item damaging the lighter item during transportation in a vehicle and during manual transportation. Such compartments can be configured such that cargo stowed in the compartments is prevented from moving more than a predetermined distance in any direction.

In embodiments, a portable cargo container and cover system 10 can include compartments that are configured as pockets on the interior and/or exterior of the container portion 20 of the system. In embodiments, a pocket can include an elasticized opening such that after an item is stowed in the pocket, the elasticized perimeter of the opening will exert elastic pressure about the opening to securely contain the item within the pocket. In another embodiment, a pocket can include a cover that can be fastened to the pocket to further secure items stowed in the pocket. In yet another embodiment, a pocket can be attached to the container portion 20 such that it is removable from the container portion 20.

In an embodiment of the present invention, the container portion 20 comprises a flexible material 33, as shown in FIG. 1. The container portion front panel 22 can comprise an open-weave, or mesh, netting material 32. Such netting 32 material permits selected visibility of items stowed within the container portion 20. For example, when the system 10 is positioned in a vehicle cargo area 60 such that the front panel 22 faces the rear of the vehicle 90, the contents of the items stowed in the container portion 20 can be readily viewed when the rear door and/or window of the vehicle 90 is opened. When quick and easy access is desired to store and/or transport items, such as tools or emergency supplies, visibility of the items in the container portion 20 is beneficial. In addition, the netting material 32 provides ventilation for items stowed in the container portion 20.

A mesh-type netting 32 useful in a container portion front panel 22 can comprise a plurality of cords positioned in side-by-side relationship and joins formed at intervals along the length of each cord. Such joins successively join the cords to each other along their length such that the cords and joins form a web structure having uniform-sized, diamond-shaped openings. A cord is a ply yarn that has been twisted together. (Fairchild's Dictionary of Textiles, 7th Edition, page 135.) A plurality of substantially inelastic yarns may be utilized to form the cords, which may comprise braided cords. The number and size of the cords and joins may vary depending on the ultimate application of the netting. Netting 32 useful in an embodiment of the present invention may be produced by warp knitting on, for example, a Raschel-type knitting machine. A variety of netting types are suitable for use in the present invention depending on the desired application. Netting 32 may comprise woven and/or non-woven yarns or fabrics, which may be spaced apart to provide a web-like structure. As an example, netting material 32 may comprise polyester or nylon.

In an embodiment of the present invention, the cover portion 40 comprises a material 42. The material can be a fabric, for example, polyester, and may include synthetic and/or natural yarns used in automotive interior compartments. In an embodiment, the cover portion 40 may be a knitted material having perforations knitted in the material 42. Such perforations would make the material 42 lighter weight and less expensive, and would allow fine particles, such as sand, to penetrate the material 42.

The cover portion 40 and the container portion back panel 23 can comprise a single piece of material. The "top edge of the back panel" refers to the location on the back panel 23 and/or the single piece of material comprising the back panel 23 and cover portion panel 41 at which the container portion top webbing 30 is attached. In an embodiment in which the container portion back panel 23 and the cover portion panel 41 comprise two separate pieces of material, the container portion top webbing 30 can be secured about an actual top edge of the back panel 23 along the width 21 of the container portion 20. The container portion top webbing 30 can be secured about an actual top edge of the cover portion panel 41 to thereby combine the container portion 20 and the cover portion 40 of the portable cargo container and cover system 10. In an embodiment in which the back panel 23 and cover portion material 42 comprise a single piece of material, the container portion top webbing 30 can be attached, for example by sewing, to the single piece of material at the desired location for the top aspect of the container portion 20.

In another embodiment, the cover portion material 42 can be a solid, non-porous material, for example, a vinyl or polyvinyl chloride (PVC). Such a material 42 can provide the cover portion 40 with a degree of rigidity so as to support lightweight articles placed on top of the cover portion 40.

The cover material 42 can be dyed to match a selected automotive interior color. In embodiments in which the cover material 42 comprises fabric, the fabric can be knit, woven, or otherwise constructed using yarns having a color that match a selected automotive interior color.

Conventional security shades can be complex due to the high number of components which must be incorporated into the ends of the security shade to provide for, among other things, the removable mounting of the security shade system. In production these numerous components must be individually assembled together, which is both cumbersome and labor intensive. In embodiments of the present invention, a cover portion 40 includes relatively few components, which decreases the cost of production. In addition, because the cover portion 40 includes few operating parts, it can be deployed quickly and easily.

The elongated support member 70 can be made of various materials having sufficient strength, or rigidity, to support a container portion 20 and cargo stowed therein when attached to a vehicle cargo area 60, and lightweight enough to allow ease of manual transportation. For example, the elongated support member 70 can be made in tubular form from a lightweight steel or fiberglass. In an embodiment, the elongated support member 70 can be formed as a solid rod of selected material.

A portable cargo container and cover system 10 of the present invention can be installed, or positioned, in a vehicle cargo area 60 in a variety of configurations. For example, the system can be positioned in a vehicle cargo area 60 such that the container portion 20 faces the rear of the vehicle 90 and the cover portion 40 covers all or part of the remainder of the vehicle cargo area 60. In this configuration, the container portion 20 is not covered and can be accessed from a rear opening of the vehicle, while items stowed in the vehicle cargo area 60 outside the container portion 20 remain covered. In another configuration, the container portion 20 can be positioned adjacent to and facing a rear seat in a vehicle cargo area 60, and the cover portion 40 covers all or part of the remainder of the vehicle cargo area 60. In this configuration, the container portion is not covered and can be accessed from inside the front portion of the vehicle 90, while items stowed in the vehicle cargo area 60 outside the container portion 20 remain covered. In yet another configuration, the container portion 20 can be positioned in, or near, the center of the vehicle cargo area 60, and the cover portion 40 covers one half or the other of the vehicle cargo area 60. For example, if the front panel 23 of the container portion 20 is oriented toward the front of the vehicle 90 and mounted in the center of the vehicle cargo area 60, items stowed in the container portion 20 can be accessed from inside the front portion of the vehicle 90, while items stowed in the rearward portion of the vehicle cargo area 60 can remain covered. In another embodiment, the cover portion 20 can be configured to cover the vehicle cargo area 60 when stretched from one side to the other side of the cargo area 60. In a side-to-side arrangement, the container portion 20 would face one of the sides of the vehicle cargo area 60. When the container portion 20 is positioned adjacent a side of the vehicle cargo area 60, items stowed in the container portion 20 may be protected from view from outside the vehicle 90. In such embodiments, the cover portion 40 covers a separate section of the vehicle cargo area 60 than the section of the vehicle cargo area 60 in which the container portion 20 is positioned. In this manner, the container portion 20 is accessible for stowing and/or removing cargo items while cargo items stowed in a separate section of the vehicle cargo area 60 remain covered. In a vehicle having a front seat, a rear seat, and a cargo area 60 behind the seats, it is desirable to provide for a folding rear sear which can be moved to a generally flat non-seating position so as to increase the cargo space. With this arrangement, it is particularly desirable to provide a security cover that can be easily removed from the vehicle so as to not obstruct transportation of large items. Advantageously, an embodiment of the present invention provides a container portion 20 and a cover portion 40, each of which do not interfere with the rearward or folded deployment of a rear seat of a vehicle.

The container portion 20 can hang freely from its attachment at the top 36 of the container portion 20 to the vehicle cargo area 60. Alternatively, the container portion 20 can include attachment means 50 at the bottom 35 of the container portion 20 and thereby be attached at the bottom 35 to the floor or walls of the vehicle cargo area 60.

A portable cargo container and cover system 10 of the present invention can be utilized in a large number of applications. Such a portable cargo container and cover system 10 can be utilized in various vehicle cargo storage areas, including trunks, rear compartments, rear lockers, truck beds, and the like, to assist in restraining items carried in the cargo storage area. Embodiments of a portable cargo container and cover system 10 of the present invention can also be utilized in marine applications, for example in boats or personal watercraft. A portable cargo container and cover system 10 of the present invention is also advantageous for use in storage areas in buildings, office areas, warehouses, and the like.

An embodiment of the present invention can be useful for containing items for stowage and for covering a cargo area 60 in a two passenger vehicle, such as a "sports coupe." In such a small-sized vehicle, or other similar vehicle, the cargo area 60 is often located directly behind the two passenger seats. In such an embodiment, the container portion 20 can be positioned facing the passenger seats so that it is accessible from the passenger seats. In this arrangement, the cover portion 40 can be positioned over the cargo area 60 behind the seats and container portion 20.

Because it is portable, a user can conveniently load items such as soccer balls, gloves, shoes, games, dolls, toys, etc. into the container portion 20 of a portable cargo container and cover system 10 before the system 10 is placed into the vehicle 90, for example, when the system is in the user's home or garage. Once items are placed into the portable cargo container and cover system 10 at the location(s) where the items are located, the user can then transport the system 10 and the contained items to the vehicle 90. The portable cargo container and cover system 10 can then be attached to the vehicle cargo area 60. Items stored within the container portion 20 are effectively prevented from rolling or sliding around in the vehicle cargo or trunk area 60 while the vehicle 90 is moving. Finally, upon arriving at a location, for example, a ball field, hotel, shopping mall, or fitness center, the user can easily remove the portable cargo container and cover system 10 from the vehicle 90 and transport it to the location where the items will be used.

The portable cargo container and cover system 10 can be mounted with the handle 71 onto a support surface after being manually transported. For example, after being transported to a user's home, office, gym, or other location, the system 10 can be hung on a hook, on the side or tailgate of a truck, over a railing, over a clothes rack, or many other available surfaces. In such a position, items can be readily placed into or removed from the container portion 20.

Figure 4:
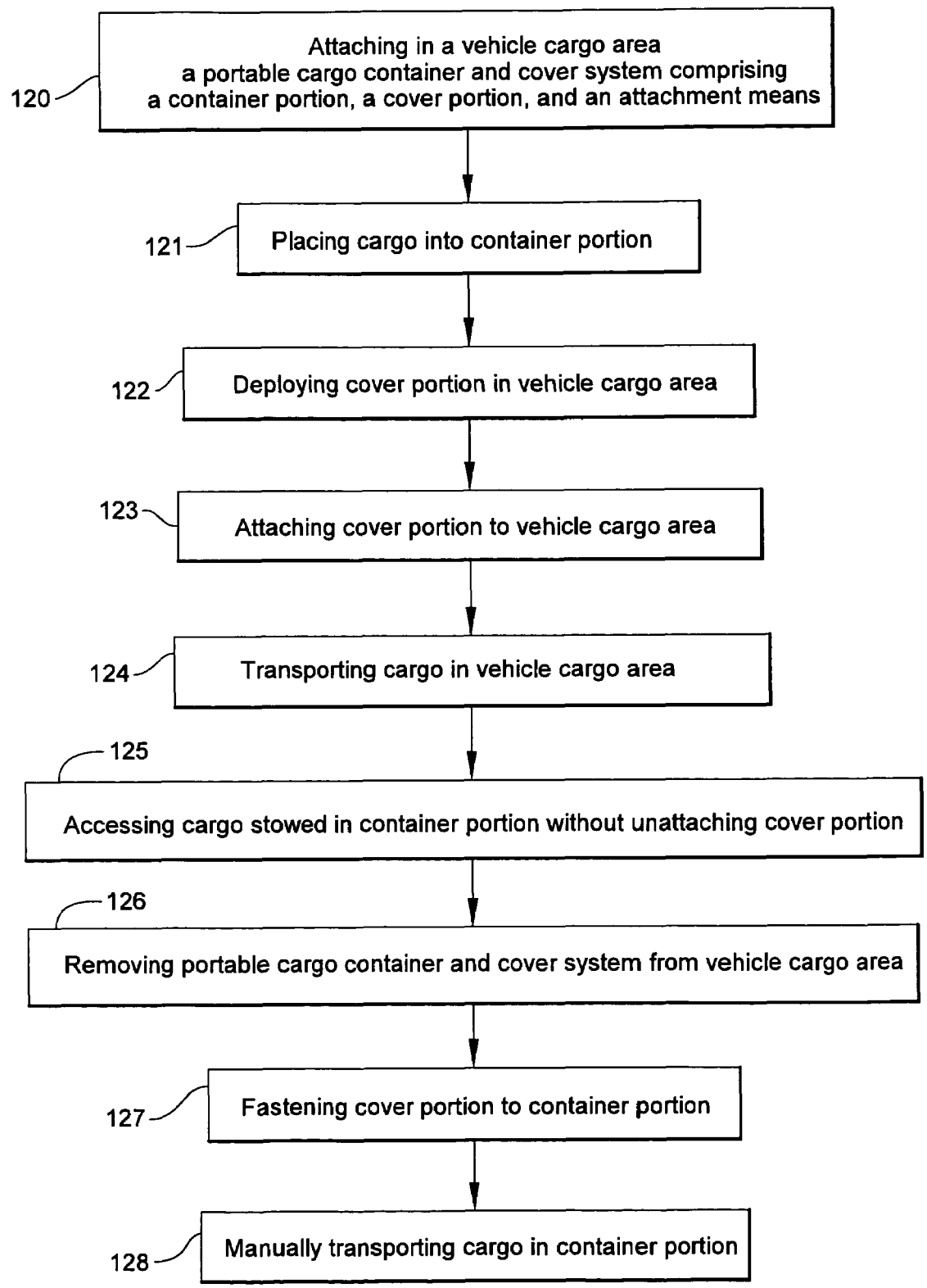
FIG. 4 is a flow chart indicating steps of a method of using a portable cargo container and cover system in an embodiment of the present invention.

The present invention includes a method of using a portable cargo container and cover system 10. For example, as shown in FIG. 4, an embodiment of such a method can include attaching (120) in the vehicle cargo area a portable cargo container and cover system 10 comprising a container portion 20 for stowing cargo, a cover portion 40 for concealing cargo from view in the vehicle cargo area 60, and an attachment means 50 for removably attaching the system 10 to the vehicle cargo area. Cargo can be placed (121) into the container portion 20 and transported (124) in the vehicle cargo area 60.

The cover portion 40 can be deployed (122) to a position remote from the container portion 20 and attached (123) to the vehicle cargo area 60 to conceal the vehicle cargo area 60 from view. In such a method, cargo stowed in the container portion 20 can be accessed (125) without unattaching the cover portion 20 from the vehicle cargo area 60. In such a method, the container portion 20 can be positioned in a first section 61 of the vehicle cargo area 60 and the cover area 40 positioned for concealing cargo from view in a second section 62 of the vehicle cargo area 60.

The method can further include removing (126) the portable cargo container and cover system 10 from the vehicle cargo area 60. After the portable cargo container and cover system is removed from the vehicle cargo area 60, the cover portion 40 can be fastened (127) to the container portion 20. The method can further include manually transporting (128) the cargo in the container portion 20.

Although the present invention has been described with reference to particular embodiments, it should be recognized that these embodiments are merely illustrative of the principles of the present invention. Those of ordinary skill in the art will appreciate that a portable cargo container and cover system of the present invention may be constructed and implemented in other ways and embodiments. Accordingly, the description herein should not be read as limiting the present invention, as other embodiments also fall within the scope of the present invention.

What is claimed is:

1. A portable cargo container and cover system, comprising:
    a container portion for stowing cargo in a vehicle cargo area;
    a cover portion for concealing cargo from view in the vehicle cargo area; and
    an attachment means for removably attaching the system to the vehicle cargo area,
    wherein when the system is removed from the vehicle cargo area, cargo stowed in the container portion is manually transportable in the container portion.

2. The system of claim 1, wherein the container portion is positionable in a first section of the vehicle cargo area and the cover portion is positionable for concealing cargo from view in a second section of the vehicle cargo area.

3. The system of claim 1, further comprising an elongated support member extending along a width at a top of the container portion.

4. The system of claim 3, further comprising a handle attached to the elongated support member for manually transporting the system.

5. The system of claim 3, further comprising a fold axis along the elongated support member, wherein the cover portion is foldable along the fold axis into juxtaposition with the container portion.

6. The system of claim 1, wherein cargo stowed in the container portion is accessible without unattaching the cover portion from the vehicle cargo area.

7. The system of claim 1, wherein the container portion comprises a front panel, a back panel, and a means for drawing the front and back panels together firmly enough as to prevent stowed cargo from inadvertently escaping from the container portion.

8. The system of claim 1, wherein the container portion comprises:
    a front panel and a back panel, each panel having edges along a top, a bottom, and opposing sides, and a width between the opposing sides;
    a side webbing secured about each side edge of the front panel and back panel enclosing opposing container portion sides;

a bottom webbing secured about the edges of the front panel and back panel at the bottom along the width of the container enclosing a container portion bottom; and a top webbing secured at the top edge of the back panel along the width of the container portion.

9. The system of claim 8, wherein the container portion further comprises an elastic cord extending along the width of the container portion and attached at the top of the front panel and at each end of the cord to the side webbing adjacent the top webbing for drawing the front and back panels together firmly enough as to prevent stowed cargo from inadvertently escaping from the container portion.

10. The system of claim 8, wherein the container portion further comprises a rigid member extending along the width of the container portion bottom.

11. The system of claim 1, wherein the container portion further comprises a plurality of compartments for stowing cargo.

12. The system of claim 7, wherein the container portion further comprises a pocket on an interior or exterior of the front or back panel.

13. The system of claim 1, wherein the cover portion comprises a dimension sufficient to cover substantially all of the vehicle cargo area.

14. The system of claim 1, wherein the cover portion is selectively deployable to at least one position remote from the container portion.

15. The system of claim 1, wherein the cover portion comprises:
 a panel comprising a substantially opaque material contiguous with the container portion and extending a length in a direction opposite the container portion; and
 a cover portion webbing secured about an edge of the cover portion opposite the container portion along the width of the cover portion.

16. The system of claim 1, wherein the attachment means is secured to each of a side near a top of the container portion and near each of opposing sides of the cover portion distal from the container portion.

17. The system of claim 16, wherein the attachment means comprises a cord loop.

18. The system of claim 17, wherein the attachment means further comprises an attachment clip attached to each cord loop.

19. The system of claim 1, further comprising a fastening means for fastening the cover portion to the container portion.

20. The system of claim 19, wherein the fastening means comprises a first fastener portion secured to the cover portion and a second fastener portion matingly engageable with the first fastener portion secured to the container portion.

21. The system of claim 20, wherein the fastening means further comprises a hook-and-loop-type fastener.

22. The system of claim 1, wherein the container portion comprises a flexible material.

23. The system of claim 7, wherein the container portion front panel comprises an open mesh netting material.

24. The system of claim 7, wherein the container portion back panel and the cover portion comprise a single piece of material.

25. A portable cargo container and cover system, comprising:
 (a) a container portion for stowing cargo in a vehicle cargo area comprising a front panel and a back panel, each panel having edges along a top, a bottom, and opposing sides, and a width between the opposing sides;
 a side webbing secured about each side edge of the front panel and back panel enclosing opposing container portion sides;
 a bottom webbing secured about the edges of the front panel and back panel at the bottom along the width of the container enclosing a container portion bottom;
 a top webbing secured at the top edge of the back panel along the width of the container portion;
 an elongated support member extending along the width of the container portion inside the top webbing; and
 a handle attached to the support member;
 (b) a cover portion for concealing cargo from view in the vehicle cargo area comprising
 a panel comprising a substantially opaque material secured to the container portion top webbing, extending a length in a direction opposite the container portion, and selectively deployable to at least one position remote from the container portion;
 a cover portion webbing secured about an edge of the cover portion opposite the container portion along the width of the cover portion; and
 a width substantially the same as the width of the container portion, the length and width of the cover portion being sufficient to cover substantially all of the vehicle cargo area; and
 (c) an attachment means for removably attaching the system to the vehicle cargo area,
 wherein when the system is removed from the vehicle cargo area, cargo stowed in the container portion is manually transportable in the container portion.

26. The system of claim 25, wherein the container portion is positionable in a first section of the vehicle cargo area and the cover portion is positionable for concealing cargo from view in a second section of the vehicle cargo area.

27. The system of claim 25, further comprising an elastic cord extending along the width of the container portion and attached at the top of the front panel and at each end of the cord to the side webbing adjacent the top webbing for drawing the front and back panels together firmly enough as to prevent stowed cargo from inadvertently escaping from the container portion.

28. The system of claim 25, further comprising a fold axis between the opposing sides of the container portion along the elongated support member, wherein the cover portion is foldable into juxtaposition with the container portion.

29. The system of claim 25, wherein the attachment means comprises:
 a cord loop secured to the container portion top webbing near each side of the container portion and to the cover portion webbing near each of opposing sides of the cover portion; and
 an attachment clip attached to each cord loop.

30. A motor vehicle, comprising:
 a cargo area; and
 a portable cargo container and cover system, comprising (a) a container portion for stowing cargo in the cargo area, and (b) a cover portion for concealing cargo from view in the cargo area, the system being removably attached to the cargo area,
 wherein when the system is removed from the cargo area, cargo stowed in the container portion is manually transportable in the container portion.

31. The motor vehicle of claim 30, wherein the container portion is positionable in a first section of the cargo area and the cover portion is positionable for concealing cargo from view in a second section of the cargo area.

32. The motor vehicle of claim 30, wherein the portable cargo container and cover system further comprises an elongated support member extending along a width at a top of the container portion and a handle attached to the support member for manually transporting the system.

33. The motor vehicle of claim 30, wherein cargo stowed in the container portion is accessible without unattaching the cover portion from the cargo area.

34. The motor vehicle of claim 30, wherein the container portion comprises a front panel, a back panel, and a means for drawing the front and back panels together firmly enough as to prevent stowed cargo from inadvertently escaping from the container portion.

35. The motor vehicle of claim 30, wherein the cover portion comprises a panel comprising a substantially opaque material contiguous with a top of the container portion and extending a length in a direction opposite the container portion.

36. The motor vehicle of claim 30, wherein the cover portion comprises a dimension sufficient to cover substantially all of the cargo area.

37. The motor vehicle of claim 30, wherein the cover portion is selectively deployable to at least one position remote from the container portion.

38. The motor vehicle of claim 30, wherein the portable cargo container and cover system is removably attached to the cargo area by an attachment means secured to each of a side near a top of the container portion and near each of opposing sides of the cover portion distal from the container portion.

39. The motor vehicle of claim 38, wherein the attachment means comprises a cord loop.

40. The motor vehicle of claim 39, wherein the attachment means further comprises an attachment clip attached to each cord loop.

41. The motor vehicle of claim 38, wherein the cargo area comprises a plurality of attachment members spaced to each engagingly receive one of the attachment means when the cover portion is in a deployed position.

42. The motor vehicle of claim 30, the portable cargo container and cover system further comprising a fastening means for fastening the cover portion to the container portion.

43. The motor vehicle of claim 30, wherein the container portion comprises a flexible material.

44. A method comprising:
   attaching in a vehicle cargo area a portable cargo container and cover system comprising (a) a container portion for stowing cargo, (b) a cover portion for concealing cargo from view in the vehicle cargo area, and (c) an attachment means for removably attaching the system to the vehicle cargo area;
   placing cargo into the container portion;
   transporting the cargo in the container portion in the vehicle cargo area;
   removing the portable cargo container and cover system from the vehicle cargo area; and
   manually transporting the cargo in the container portion.

45. The method of claim 44, further comprising, prior to removing the portable cargo container and cover system from the vehicle cargo area, deploying the cover portion to a position remote from the container portion and attaching the cover portion to the vehicle cargo area to conceal the vehicle cargo area from view.

46. The method of claim 45, further comprising accessing cargo stowed in the container portion without unattaching the cover portion.

47. The method of claim 44, further comprising, after removing the portable cargo container and cover system from the vehicle cargo area, fastening the cover portion to the container portion.

48. The method of claim 44, further comprising positioning the container portion in a first section of the vehicle cargo area and positioning the cover area for concealing cargo from view in a second section of the vehicle cargo area.

49. The method of claim 44, wherein the portable cargo container and cover system further comprises an elongated support member extending along a width at a top of the container portion and a handle attached to the support member for manually transporting the system.

50. The method of claim 44, wherein the container portion comprises a flexible material.

* * * * *